F. A. ROCKWELL.
Candlestick.
No. 297.
Reissued Feb. 27, 1855.
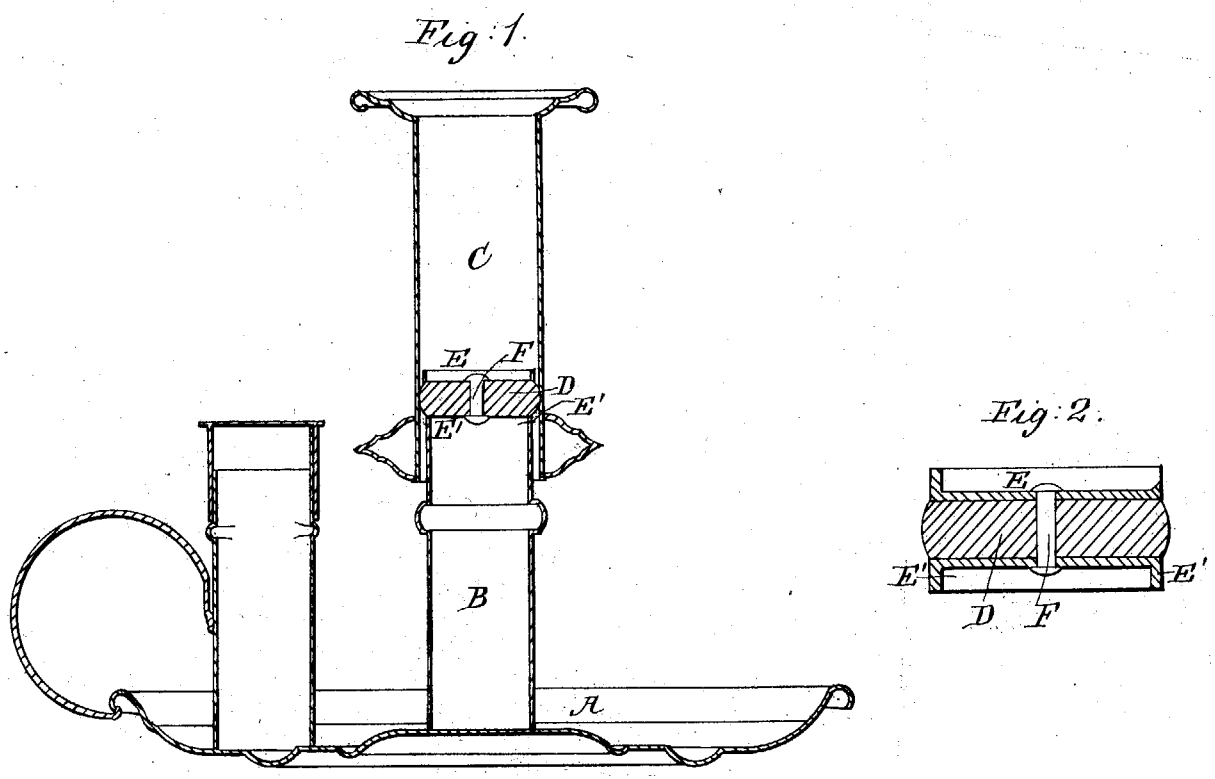
N. PETERS, Photo-Lithographer, Washington, D. C.

UNITED STATES PATENT OFFICE.

JOHN W. ROCKWELL, OF RIDGEFIELD, CONNECTICUT, ASSIGNEE OF FRANCIS A. ROCKWELL.

IMPROVEMENT IN CANDLESTICKS.

Specification forming part of Letters Patent No. 8,594, dated December 16, 1851; Reissue No. 297, dated February 27, 1855.

*To all whom it may concern:*

Be it known that FRANCIS A. ROCKWELL, of Ridgefield, in the county of Fairfield and State of Connecticut, has invented certain new and useful Improvements in Candlesticks; and I do hereby declare that the following is a full, clear, and exact description of the same, reference being had to the accompanying drawings, making a part thereof, in which—

Figure 1 represents a vertical transverse section of one of the candlesticks, Fig. 2 represents an enlarged view of the cork and two plates detached from the candlestick, it being a vertical transverse section of the same.

Similar letters in the two figures denote like parts.

The nature of this invention consists in the employment in candlesticks of elastic packing attached to the standard or slide of the candlestick, whereby I am enabled to support the sliding portion, prevent the leaking of the grease, and by which means a shorter sliding socket may be used than heretofore, where a cork was inserted loose in the socket or sliding part.

To enable others skilled in the art to make and use this invention, I will proceed to describe the same with reference to the drawings.

A represents the base of an ordinary candlestick, and B the hollow standard connected therewith. C represents a sliding socket, which may be constructed in the manner shown in the drawings, or in any other suitable manner.

D represents a piece of cork, or any other elastic material that will answer the same purpose of the cork. This cork is secured between two metallic plates, E E′, by means of a bolt or rod, F, passing directly through them, as seen in the drawings, and more particularly in the enlarged view, Fig. 2. These metallic plates may have rims projecting from their horizontal surface of a slight depth, and the rim of the top plate, E, serving as a receptacle for the candle, while its bottom serves as a protection to the cork packing, to prevent its being burned or injured when the candle is nearly consumed. The rim of the bottom plate, E′, is made to fit over the outer periphery of the hollow standard, or to a bar or spring of the candlestick, as the case may be, and then soldered or otherwise secured. Thus the cork is held in a permanent position on said standard, bar, or spring, and is controlled by them, which is not the case in a device heretofore used for a similar purpose, in which the cork was loose, causing much trouble and inconvenience in using it, for when the sliding socket is moved down and then again elevated the cork will occupy a position in the upper end of the tube, and thus render it very disagreeable to use and manage on account of the grease, as it would necessarily require that the cork should be pressed down in some way before a candle could be inserted, which makes it as troublesome to manage as an ordinary candlestick. The invention obviates all these difficulties, as the cork is always stationary, or firmly secured to the standard or other similar device—such as a bar, spring, or sliding portion of the candlestick—and the sliding socket or other equivalent device is raised and lowered without the least danger of loosening the cork, or otherwise disconnecting it from the standard or other part of the candlestick to which it is connected.

It will be seen that by the employment of these metallic plates in combination with the cork the cork may be securely fastened to the standard or other part heretofore referred to, all grease prevented from running down the sides of the candlestick, and that the candle may be entirely consumed without injury to the cork or other elastic substance, for as the candle is being consumed the sliding socket may be lowered until it passes down below the metallic plate E, the rim of which plate will then serve as the socket, and thus the entire candle, without any waste, may be burned or consumed, which is seldom the case in the ordinary candlestick. The cork or other expansive substance effectually prevents the grease from running down the sides of and into the hollow standard, as the periphery of the elastic substance is made to press or fit snugly against the inner periphery of the sliding socket or other part of the candlestick.

This invention may be readily applied to the ordinary spring-candlestick in common use to great advantage, as it will effectually obviate the great difficulty experienced from their use, as the socket, and also the snifting slide, often become clogged with grease, and thereby preventing the slides working freely, and often the slide is bent or broken in endeavoring to overcome the resistance of the hard tallow which may have collected in the socket. To apply it to the ordinary candlestick the packing is merely transposed to the slide, which would then be the equivalent of the standard, the change being that ordinarily made in moving a part which was before stationary, the effect produced being the same identically—as, for instance, in moving the cylinder or piston either of an engine, pump, &c.

I do not claim the employment of a detached cork or other elastic substance over which a sliding socket is allowed to move, nor do I claim the employment of a sliding socket; but What I do claim as the invention of the aforesaid FRANCIS A. ROCKWELL, and desire to secure by Letters Patent, is—

The employment of elastic packing attached to the standard, bar, spring, or slide of a candlestick substantially in the manner described, whereby I am enabled to support said part, prevent the leaking of the grease, and use a shorter sliding socket than when the cork is inserted loose in the socket.

JOHN W. ROCKWELL.

Witnesses:

HIRAM K. SCOTT,

GEORGE W. GORHAM.